(12) United States Patent
Narita et al.

(10) Patent No.: US 12,372,148 B2
(45) Date of Patent: Jul. 29, 2025

(54) TORSIONAL DAMPER

(71) Applicant: NOK CORPORATION, Tokyo (JP)

(72) Inventors: Nobuhiko Narita, Tottori (JP); Koki Shionuma, Tottori (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/694,014

(22) PCT Filed: Dec. 20, 2022

(86) PCT No.: PCT/JP2022/046805
§ 371 (c)(1),
(2) Date: Mar. 21, 2024

(87) PCT Pub. No.: WO2023/132226
PCT Pub. Date: Jul. 13, 2023

(65) Prior Publication Data
US 2025/0146567 A1 May 8, 2025

(30) Foreign Application Priority Data
Jan. 7, 2022 (JP) .................. 2022-001967

(51) Int. Cl.
*F16H 55/36* (2006.01)
*F02B 67/06* (2006.01)

(52) U.S. Cl.
CPC .............. *F16H 55/36* (2013.01); *F02B 67/06* (2013.01); *F16H 2055/366* (2013.01)

(58) Field of Classification Search
CPC ..... F16H 55/36; F16H 2055/366; F02B 67/06

USPC .................................................... 474/94, 161
See application file for complete search history.

(56) References Cited

U.S. PATENT DOCUMENTS

| | | | | |
|---|---|---|---|---|
| 3,088,332 A * | 5/1963 | Arnt, Jr. | ................ | F16F 15/126 464/89 |
| 3,280,654 A * | 10/1966 | Arnt, Jr. | ................ | F16F 15/126 29/451 |
| 4,710,152 A * | 12/1987 | Ichikawa | ............ | F16F 15/1442 474/166 |

(Continued)

FOREIGN PATENT DOCUMENTS

| | | |
|---|---|---|
| JP | H05-202987 A | 8/1993 |
| JP | H11-109979 A | 4/1999 |

(Continued)

*Primary Examiner* — Henry Y Liu
(74) *Attorney, Agent, or Firm* — Harness, Dickey & Pierce, P.L.C.

(57) ABSTRACT

A torsional damper is provided having a hub in which a boss adapted to be fixed to a rotating shaft, such as a crankshaft of an engine, and an annular rim are integrally provided via a plurality of stays, and an annular vibration ring connected to an outer circumferential surface of the rim via an elastic body. The stays have a circumferential width dimension that does not exceed one-quarter of the wavelength of the axial resonant frequency of the hub, and are thickened within a range in which the axial thickness dimension does not exceed one-half of the wavelength of the axial resonant frequency of the hub. Thickening of the stays is implemented by, for example, setting the axial thickness dimension thereof to a length equal to or more than one-quarter of the wavelength of the axial resonant frequency of the hub. The stays have an axially inclined shape.

9 Claims, 5 Drawing Sheets

(56) References Cited

U.S. PATENT DOCUMENTS

| | | | | |
|---|---|---|---|---|
| 4,794,816 A * | 1/1989 | Serizawa | ............ | F16F 15/1442 474/166 |
| 4,881,426 A * | 11/1989 | Serizawa | ................ | F16H 55/36 474/166 |
| 5,231,893 A * | 8/1993 | Sisco | .................... | F16F 15/126 74/604 |
| 5,308,289 A * | 5/1994 | Funahashi | ............... | F16F 15/10 474/903 |
| 5,449,322 A * | 9/1995 | Wagner | ............... | F16F 15/1442 464/90 |
| 5,591,093 A * | 1/1997 | Asai | ........................ | F16H 55/36 474/902 |
| 5,966,996 A * | 10/1999 | Hamaekers | ............. | F16H 55/44 464/180 |
| 6,171,194 B1 * | 1/2001 | Haga | ........................ | F16D 3/52 464/903 |
| 6,684,735 B2 * | 2/2004 | Watanabe | ........... | F16F 15/1203 428/450 |
| 6,984,432 B2 * | 1/2006 | Tagawa | ................ | F16F 15/126 428/447 |
| 7,047,644 B2 * | 5/2006 | Hodjat | .................. | F16F 15/126 474/178 |
| 7,150,088 B2 * | 12/2006 | Kano | .................... | F16F 15/126 29/451 |
| 7,171,750 B2 * | 2/2007 | Kano | .................... | F16F 15/126 29/451 |
| 7,300,372 B2 * | 11/2007 | Riu | ...................... | F16F 15/126 474/94 |
| 7,354,637 B2 * | 4/2008 | Tagawa | ................ | F16F 15/126 428/141 |
| 7,395,796 B2 * | 7/2008 | Masuda | ................ | F16F 15/126 123/192.1 |
| 7,850,557 B2 * | 12/2010 | Moriya | .................... | F16H 55/36 474/902 |
| 9,835,226 B2 * | 12/2017 | Son | ...................... | F16F 15/173 |
| 10,663,031 B2 * | 5/2020 | Komyo | ................ | F16J 15/3232 |
| 11,162,570 B2 * | 11/2021 | Kinoshita | ............... | F16H 55/40 |
| 11,174,380 B2 * | 11/2021 | Negami | .................... | C08K 3/04 |
| 11,549,579 B2 * | 1/2023 | Casagrande | ........ | F16F 15/1442 |
| 2002/0129675 A1 * | 9/2002 | Watanabe | ........... | F16F 15/1203 74/574.4 |
| 2003/0035966 A1 * | 2/2003 | Tagawa | ................ | F16F 15/126 428/450 |
| 2004/0166974 A1 * | 8/2004 | Hodjat | .................. | F16F 15/126 474/170 |
| 2005/0116401 A1 * | 6/2005 | Kano | .................... | F16F 15/126 267/273 |
| 2005/0160572 A1 * | 7/2005 | Kano | .................... | F16F 15/126 29/451 |
| 2005/0250584 A1 * | 11/2005 | Tagawa | ................ | F16F 15/126 464/89 |
| 2006/0094547 A1 * | 5/2006 | Xu | ........................ | F16F 15/126 474/94 |
| 2008/0017157 A1 * | 1/2008 | Masuda | ................ | F16F 15/126 123/192.2 |
| 2009/0145261 A1 * | 6/2009 | Obeshaw | ............ | F16F 15/1442 74/574.4 |
| 2012/0231909 A1 * | 9/2012 | Shin | ...................... | F16F 15/126 474/94 |
| 2017/0067534 A1 * | 3/2017 | Son | ...................... | F16F 15/173 |
| 2018/0274626 A1 * | 9/2018 | Komyo | .................... | F16C 33/72 |
| 2019/0032766 A1 * | 1/2019 | Hanson | ................... | F16H 55/36 |
| 2019/0186611 A1 * | 6/2019 | Kinoshita | ............... | F16H 55/40 |
| 2020/0048446 A1 * | 2/2020 | Negami | .................. | C08L 23/16 |
| 2020/0332875 A1 * | 10/2020 | Casagrande | ........ | F16F 15/1442 |
| 2021/0123447 A1 * | 4/2021 | Oyama | ...................... | F16J 15/16 |
| 2021/0402504 A1 * | 12/2021 | Wilson | ................ | B23K 20/2275 |

FOREIGN PATENT DOCUMENTS

| | | |
|---|---|---|
| JP | 2017-106563 A | 6/2017 |
| JP | 2020-041684 A | 3/2020 |

* cited by examiner

TORSIONAL DAMPER

CROSS REFERENCE TO RELATED APPLICATIONS

This application is a 371 U.S. National Phase of International Application No. PCT/JP2022/046805, filed on Dec. 20, 2022, which claims priority to Japanese Patent Application No. 2022-001967, filed Jan. 7, 2022. The entire disclosures of the above applications are incorporated herein by reference.

BACKGROUND

Technical Field

The disclosure relates to a torsional damper.

Related Art

A torsional damper is used, for example, as a crank pulley for driving auxiliary equipment in an automobile engine. The crank pulley is attached to an end of a crankshaft provided in the engine, and drives the auxiliary equipment through a belt.

The torsional damper used as a crank pulley has a hub fixed to the crankshaft, and has a structure in which a vibration ring is connected to the outer circumferential surface of the hub via an elastic body. When viewed as a dynamic vibration absorber, the elastic body acts as a spring and the vibration ring acts as a mass (mass body). The mechanism of suppressing vibration by the torsional damper is such that the vibration ring rotates to follow the rotation of the crankshaft to resonate in a rotational direction, thereby suppressing the torsional resonance of the crankshaft.

Due to the structure of an engine, the crankshaft in rotation generates vibration. The crankshaft vibration is transmitted to the torsional damper and radiated mainly from the hub, thus generating radiated sound. The radiated sound becomes noise, so that various techniques have been considered to suppress the radiated sound.

For example, Japanese Unexamined Patent Application Publication No. 05-202987 (Patent Document 1) discloses a method for suppressing radiated sound radiated from a hub by attaching an acoustic board to the front surface of the hub of a torsional damper.

As another method, there is known a torsional damper provided with a hollow section in a hub, as disclosed in, for example, Japanese Unexamined Patent Application Publication No. 2020-041684 (Patent Document 2). A part of the radiated sound guided into the hollow section is converted into a sound wave of an opposite phase to the radiated sound generated by the hub, thus attempting to muffle the radiated sound by sound wave interference (refer to paragraph [0030] of Document 2).

In the case where an acoustic board is attached to a torsional damper as in the disclosure described in Japanese Unexamined Patent Application Publication No. 05-202987 (Patent Document 1), the number of parts increases and the cost of parts inconveniently increases. Another thing that should be avoided is an increase in the number of manufacturing process steps.

The disclosure described in Japanese Unexamined Patent Application Publication No. 2020-041684 (Patent Document 2) does not require a separate part such as an acoustic board, and therefor, an advantage in terms of the number of parts and manufacturing process steps is recognized. However, a dedicated space for the hollow section is required, thus making an increase in size unavoidable.

Both disclosures described in the above two documents (Patent Documents 1 and 2) are desired to be improved. Radiated sound is desired to be reduced while avoiding disadvantages such as addition of more elements or an increase in size.

SUMMARY

An aspect of a torsional damper has a hub in which a boss adapted to be fixed to a rotating shaft and an annular rim are integrally provided via a plurality of stays, and an annular vibration ring connected to an outer circumferential surface of the rim via an elastic body, wherein the stays have a circumferential width dimension that does not exceed one-quarter of a wavelength of an axial resonant frequency of the hub.

Effect

Radiated sound can be reduced.

DETAILED DESCRIPTION

An embodiment will be described with reference to the accompanying drawings. The present embodiment is an example of application to a pulley used in an inline 4-cylinder, 4-stroke engine. A description will be given on the following items.
1. Configuration
   (1) Engine
   (2) Basic configuration of the torsional damper
   (3) Stays
2. Operation and Effect
   (1) Basic operation and effect
   (2) Suppression of noise
      (a) Equivalent radiated power
      (b) Circumferential width of stays
      (c) Axial thickness of stays
      (d) Inclined shape of stays
      (e) Summarization
3. Modified Examples

1. Configuration (1) Engine

Figure 1:
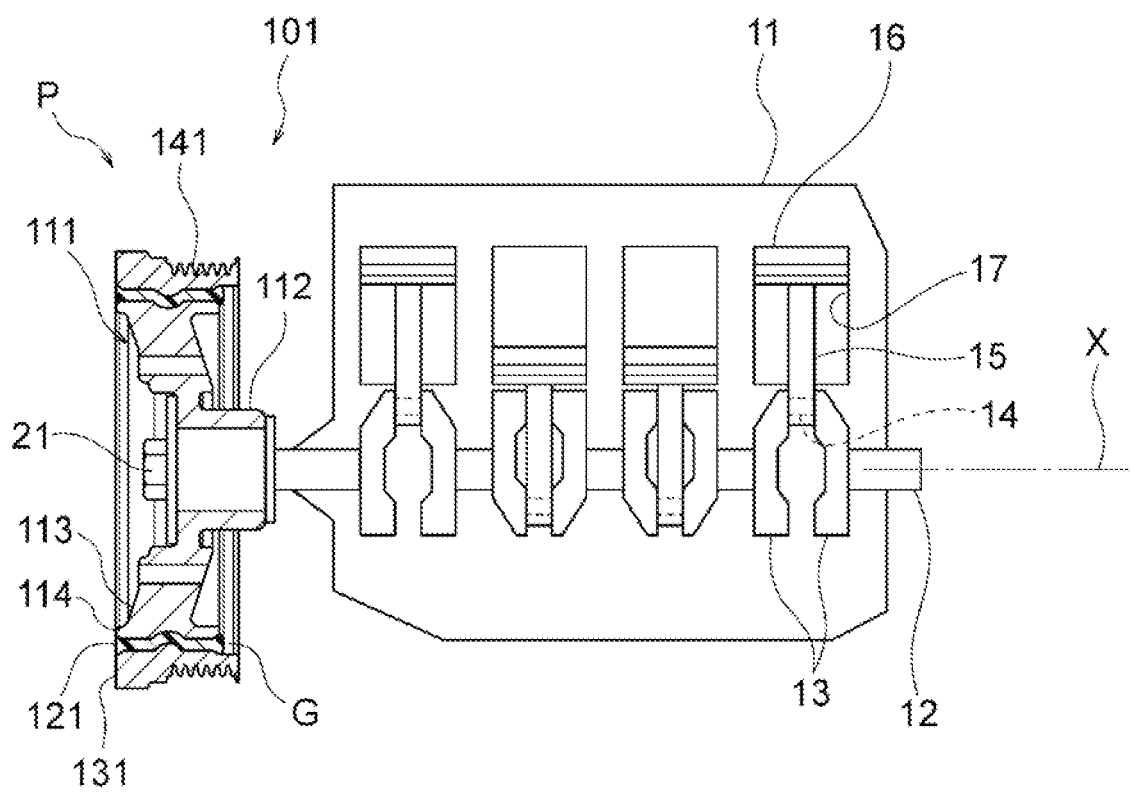
FIG. 1 is a schematic diagram of a torsional damper also used as a pulley by being fixed to a crankshaft of a 4-cylinder engine.

As illustrated in FIG. 1, a crankshaft 12 (rotating shaft) is rotatably installed to an engine 11. The crankshaft 12 is horizontally placed, and has a torsional damper 101, which is configured as a pulley P, fixed to one end thereof.

The crankshaft 12 has a counterbalance 13 for each cylinder, a piston 16 being installed to a pin 14 via a con-rod 15. The piston 16 is slidably accommodated in a cylinder 17. The piston 16 slides in a vertical direction orthogonal to the axis of the crankshaft 12.

(2) Basic Configuration of the Torsional Damper

Figure 2:
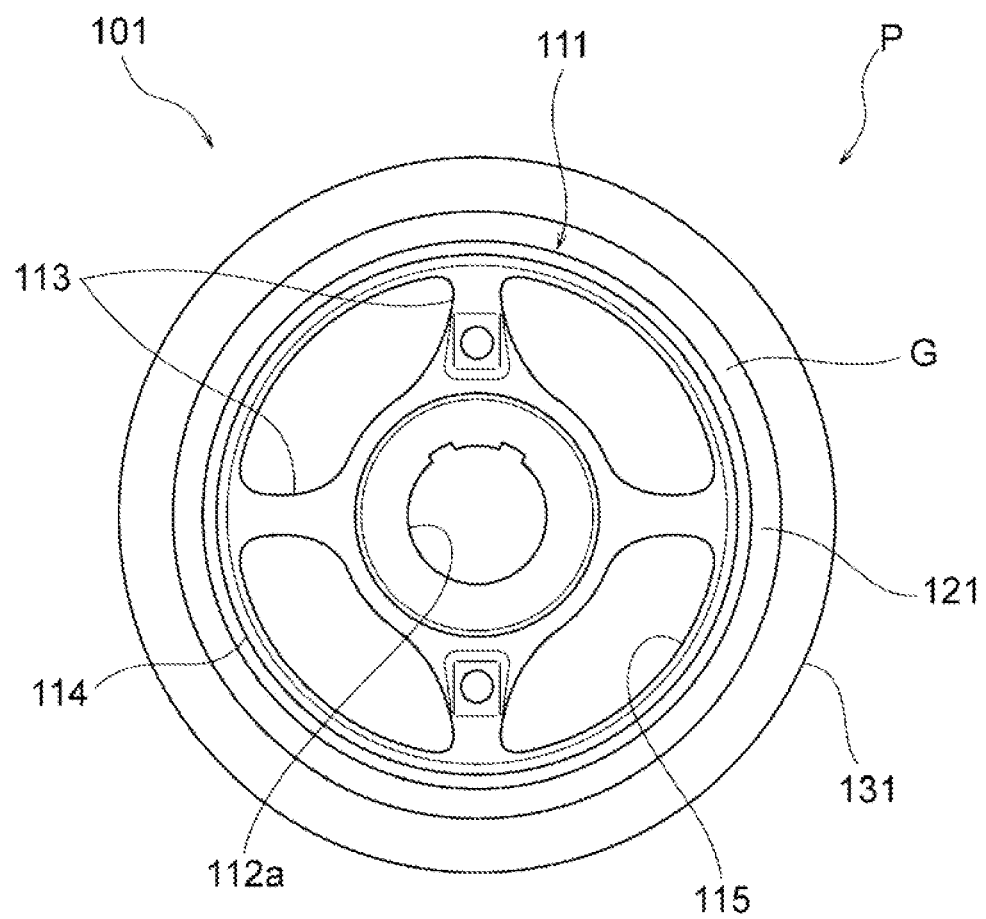
FIG. 2 is a front view of the torsional damper of the present embodiment.
Figure 4:
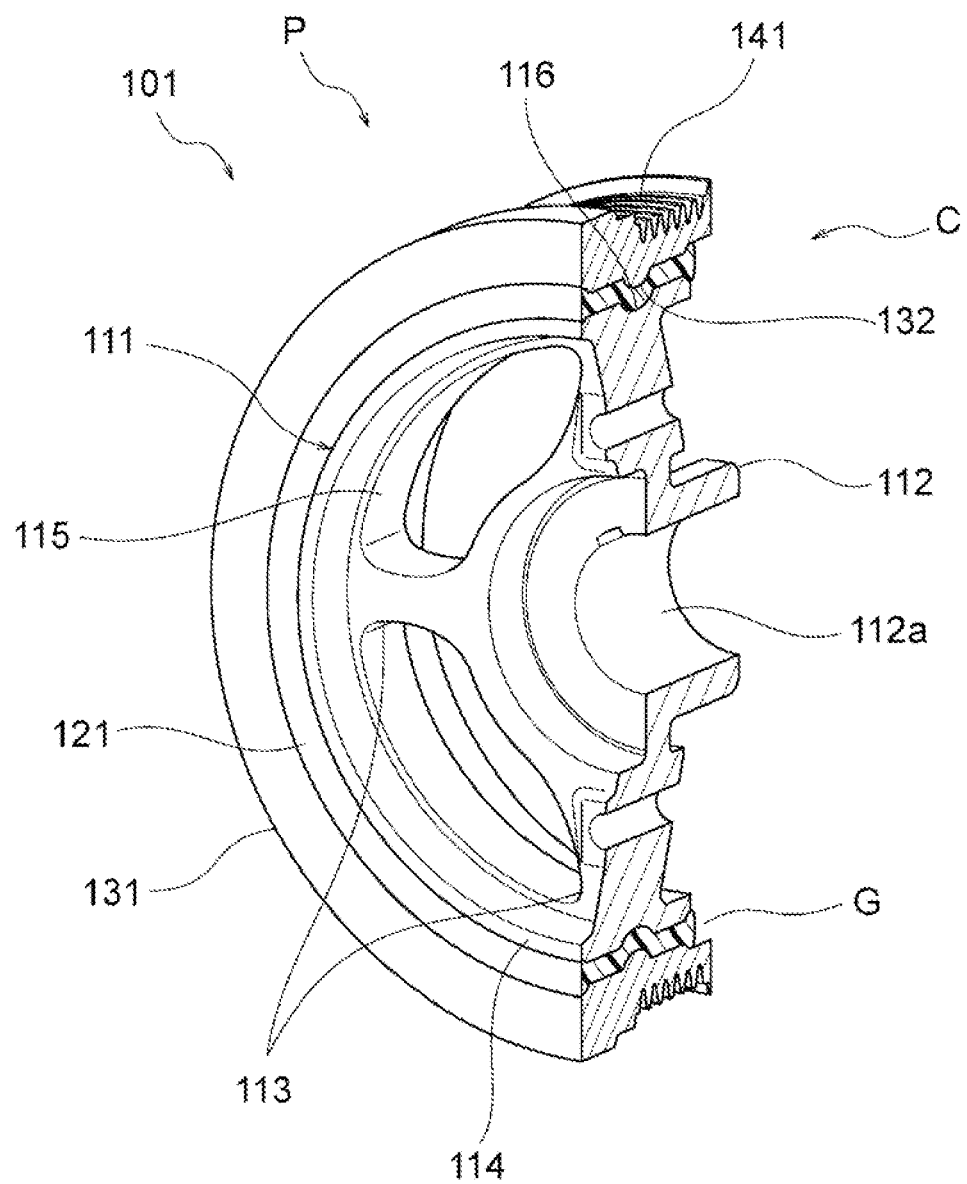
FIG. 4 is a perspective view of the torsional damper illustrated in longitudinal section at a central position.

As illustrated in FIG. 2 and FIG. 4, the torsional damper 101 has an annular vibration ring 131 connected to a hub 111 via an elastic body 121, and is provided with belt grooves 141 on the outer circumferential surface of the vibration ring 131.

The hub 111 has, at a central position thereof, a boss 112 adapted to be fixed to the crankshaft 12 of the engine 11, which is a rotating shaft, and also has a rim 114 provided via stays 113 raised radially outward from the boss 112.

The boss 112 is a member having a cylindrical shape, and has a mounting hole 112a at the center for fitting the rotating shaft therein. The hub 111 is fixed to the crankshaft 12 by fixing one end of the crankshaft 12, which has been fitted in the mounting hole 112a, by a bolt 21. In this state, the boss 112 rotates as the crankshaft 12 rotates, with an axis A of the boss 112 being aligned with an axis X, which is the center of rotation of the crankshaft 12.

The stays 113 are members interposed between the boss 112 and the rim 114 to connect the boss 112 and the rim 114. Four stays 113 are provided, the individual stays being arranged at equal intervals on a circumference concentric with the axis A of the boss 112. Four holes 115 are formed between the individual stays 113. These holes 115 are also arranged at equal intervals on the circumference concentric with the axis A of the boss 112.

The rim 114 is an annular member extending along the axial direction of the hub 111 from the ends of the stays 113, and is placed concentrically with the axis A of the boss 112. Therefore, the outer circumferential surface of the rim 114 is positioned on the circumference concentric with the axis A of the boss 112. The diameter of the outer circumferential surface of the rim 114 is not constant, and the diameter becomes shorter at approximately the central position in the axial direction due to a rim recess 116. The rim recess 116 is for forming a convolution C together with the vibration ring 131, the details of which will be described later.

The hub 111 composed of the boss 112, the stays 113, and the rim 114 is formed in one piece, using, for example, a metal as a material therefor.

The elastic body 121 is an annular member having a uniform diameter, and interposed between the rim 114 and the vibration ring 131 to elastically connect the rim 114 and the vibration ring 131. Such an elastic body 121 is formed using, for example, rubber as a material therefor, and has a uniform thickness over the entire circumference.

The vibration ring 131 is an annular member having the inner circumferential surface thereof facing the outer circumferential surface of the rim 114 of the boss 112 via a gap G in which the elastic body 121 is interposed. Such a vibration ring 131 functions as a mass (mass body) having a natural frequency due to the structure of being held via the elastic body 121.

A ring projection 132, which matches the shape of the rim recess 116 formed in the outer circumferential surface of the rim 114, is formed on the inner circumferential surface of the vibration ring 131. These rim recess 116 and the ring projection 132 are provided over the entire circumferences of the rim 114 and the vibration ring 131 in the circumferential direction thereof, configuring the convolution C. The convolution C enhances the sliding resistance of the elastic body 121 between the rim 114 and the vibration ring 131, thus suppressing the elastic body 121 from being displaced or slipping out.

The vibration ring 131 has a plurality of belt grooves 141 formed in the outer circumferential surface thereof in the circumferential direction. These belt grooves 141 have a V-shaped cross section, and are structures around which an endless belt for power transmission is wound to drive various types of auxiliary equipment (none of which being illustrated). By providing the belt grooves 141, the torsional damper 101 serves as a pulley P.

(3) Stays

The stays 113 of the torsional damper 101 of the present embodiment have a circumferential width dimension that does not exceed one-quarter of the wavelength of a resonant frequency of the hub 111 in the axial direction, i.e., the direction of the axis A (refer to FIG. 1).

The resonant frequency of the hub 111 is, for example, 3.7 kHz. The wavelength of the resonant frequency is:

Wavelength=approximately 340 [m/s]/frequency [Hz]

Therefore, the wavelength of the axial resonant frequency of the hub 111 is approximately 0.092 m (92 mm). Consequently, the stays 113 have a circumferential width dimension not exceeding 23 mm, which is one-quarter of 92 mm.

The stays 113 of the present embodiment are thickened within a range in which the axial thickness dimension does not exceed one-half of the wavelength of the axial resonant frequency of the hub 111.

As described above, the wavelength of the axial resonant frequency of the hub 111 is approximately 92 mm. Thus, the stays 113 are thickened within a range not exceeding 46 mm, which is one-half of 92 mm.

The term "thickened" here means, for example, to set the thickness to be equal to or more than one-quarter of the wavelength of the axial resonant frequency of the stays 113. In the case of this example, the axial thickness of the stays 113 is set to a range of 23 to 46 mm.

As another example, the term "thickened" means to set the thickness to be equal to or more than the circumferential width dimension. The circumferential width dimension of the stays 113 is set to a range not exceeding 23 mm as described above. For example, if the circumferential width dimension of the stays 113 is set to 20 mm, then the axial thickness of the stays 113 is set to a range of 20 to 46 mm.

In simpler terms, the shape of the stays 113 described above can be described as narrower in the circumferential direction and thicker in the axial direction in comparison with the stays included in a typical torsional damper. The thickness in the axial direction is greater in order to increase the rigidity of the stays 113.

Figure 3:
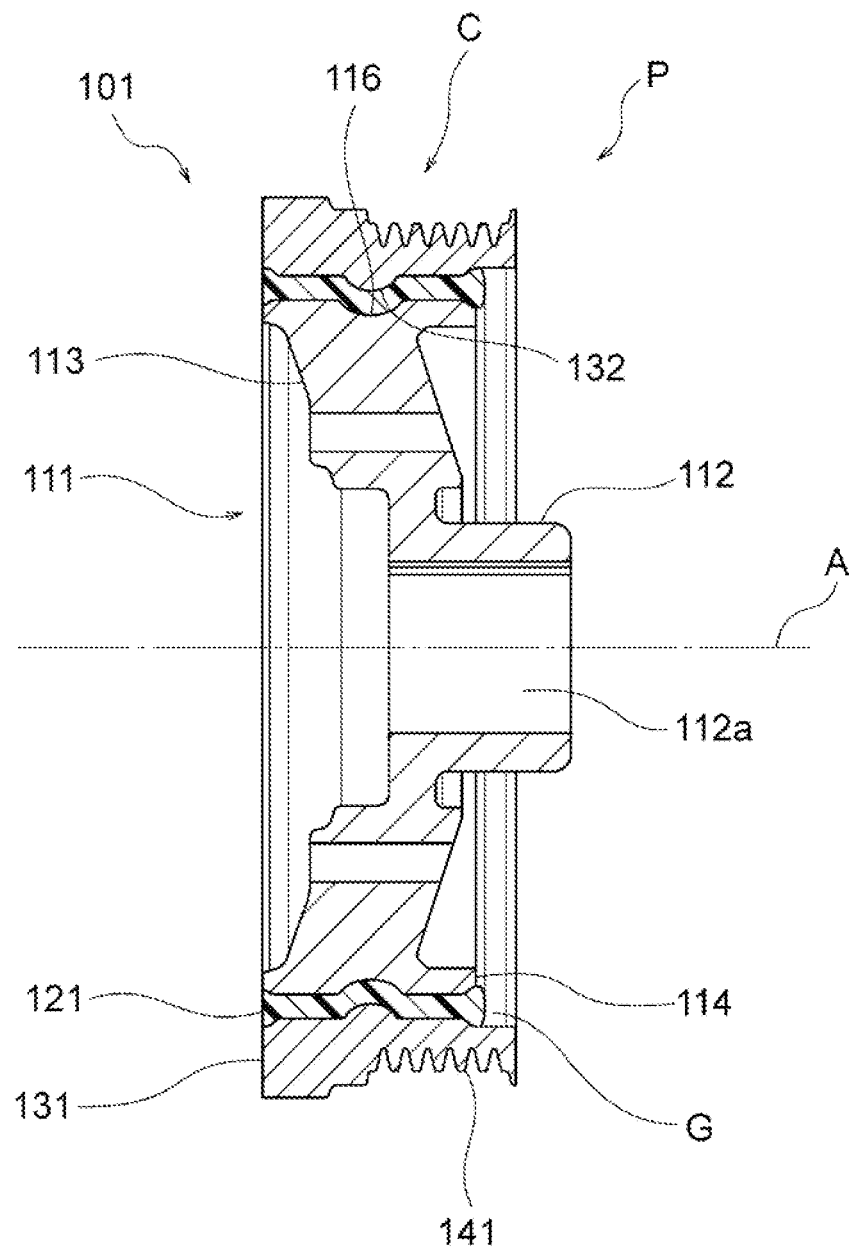
FIG. 3 is a longitudinal sectional side view of the torsional damper.

In terms of securing rigidity, the stays 113 of the present embodiment have an axially inclined shape (refer to FIGS. 2 and 3). The front and back surfaces of the stays 113 are inclined at the same angle. In other words, the front and back surfaces of the stays 113, which are shaped to be inclined in the axial direction, have parallel portions.

2. Operation and Effect (1) Basic Operation and Effect

In such a configuration, when the crankshaft 12 rotates by starting the engine 11, the torsional damper 101 also rotates. At this time, power is transmitted to auxiliary equipment, because the torsional damper 101 also constitutes the pulley P.

The torsional damper 101 has a natural frequency in the torsional direction because the vibration ring 131 functions as a mass (mass body). Therefore, in the case where the crankshaft 12 rotates and torsional vibration is generated, the torsional vibration generated in the crankshaft 12 can be absorbed and reduced by tuning the natural frequency of the torsional damper 101 in the torsional direction to match the torsional resonant frequency.

In general, the torsional resonant frequency generated in the crankshaft 12 is frequently approximately 300 to 600 Hz. Therefore, the natural frequency of the torsional damper 101 in the torsional direction is also tuned to approximately 300 to 600 Hz in accordance with the torsional resonant frequency generated in the crankshaft 12.

(2) Suppression of Noise

The crankshaft 12 vibrates also in the direction of the axis X. Thus, the torsional damper 101 also resonates in the direction of the axis A (hereinafter referred to as "axial direction") that coincides with the axis X. At this time, the axial resonant frequency of the vibration ring 131 is approximately several hundred Hz, which is approximately the same as the torsional vibration.

Meanwhile, the hub 111 resonates in the axial direction at a higher frequency of several thousand Hz. When the hub 111 resonates at a higher frequency, the radiated sound emitted from the hub 111 inconveniently propagates as noise.

(a) Equivalent Radiated Power

To understand the noise generated by the hub 111, equivalent radiated power is assumed here. The equivalent radiated power is an index representing the degree of sound generated by an object. If the equivalent radiated power can be reduced, then the radiated sound emitted from the hub 111 can be reduced.

The calculation formula of the equivalent radiated power is as represented by expression (1).

$$P = \tau \times (sv/2) \times md \times a \times v^2 \qquad (1)$$

where
P: equivalent radiated power
τ: radiation loss coefficient
sv: sound velocity
md: material density
a: area
v: vibration velocity The radiation loss coefficient τ is a coefficient depending on the shape of an object. The coefficient represents the degree of sound radiation, as can be imagined from the fact that, for example, a thin piano wire has weak sound radiation and a wide flat plate has strong sound radiation.

The material density md is a material-dependent factor. The material density is determined by, for example, a spongy structure or a high-density material without bubbles.

The area a means the projection area of a vibrating body.

In the torsional damper 101, the hub 111 is usually made of a metal such as cast iron, so that there is little room for ingenuity in terms of suppressing noise caused by radiated sound. Factors that are considered to be effective in suppressing noise are the radiation loss coefficient τ and the area a in terms of shape, and the vibration velocity v in terms of aspects other than shape. The radiated sound emitted from the hub 111 can be reduced by reducing the values of the three factors, namely, "the radiation loss coefficient τ," "the area a," and "the vibration velocity v."

However, it is difficult to devise measures to reduce the values of the above three factors for the boss 112 and the rim 114 of the hub 111. Therefore, in the present embodiment, the shape of the stays 113 is devised to reduce the values of the above three factors.

(b) Circumferential Width of Stays

In the present embodiment, the circumferential width of the stays 113 is smaller. As previously described, the width does not exceed one-quarter of the wavelength of the axial resonant frequency of the hub 111. This reduces both the radiation loss coefficient τ and the area a, and the equivalent radiated power P becomes smaller accordingly, thus reducing the radiated sound emitted from the hub 111.

A description will be given below in more detail.

Depending on the dimensions of a vibrating body, the sound radiated from the vibrating body is divided into two types of frequencies, namely, frequencies that are efficiently radiated and frequencies that are inefficiently radiated. If the vibrating body is rectangular, then sound of a frequency having a wavelength shorter than the minimum width dimension of the vibrating body is radiated forward as air compressional waves. On the other hand, a frequency of a wavelength longer than the minimum width dimension causes a diffraction phenomenon in which surrounding air wraps around behind along the side surfaces of the vibrating body, and is not propagated to the surroundings as compressional waves. In particular, if the vibrating body has a minimum width of one-quarter of the wavelength, then there will be no radiated sound. This means that the radiation loss coefficient τ becomes extremely small.

Therefore, in the present embodiment, the circumferential width of the stays 113 is set to a width not exceeding one-quarter of the wavelength of the axial resonant frequency of the hub 111, e.g., a width of one-quarter. This makes it possible to suppress radiated sound generated by the hub 111.

(c) Axial Thickness of Stays

In the present embodiment, the thickness of the stays 113 is increased in the axial direction to increase the rigidity. Increasing the rigidity of the stays 113 decreases the axial vibration of the stays 113, causing the vibration state to shift toward higher frequencies. As a result, the vibration velocity v decreases, and the equivalent radiated power P is decreased, thus reducing the radiated sound emitted from the hub 111.

However, excessively increasing the thickness of the stays 113 in the axial direction makes it difficult for the above-described diffraction phenomenon to take place. This is because the diffraction phenomenon is a phenomenon in which air wraps around behind along the side surfaces of the vibrating body, and therefore, if the side length of the vibrating body is long, it becomes difficult for air to wrap around behind. If this happens, then the radiation loss coefficient τ will not become sufficiently small.

In the present embodiment, therefore, the thickness of the stays 113 is limited to a range in which the thickness does not exceed one-half of the wavelength of the axial resonant frequency of the hub 111, thus preventing the diffraction phenomenon from slowing down.

(d) Inclined Shape of Stays

The rigidity in the axial direction can be significantly increased by inclining the stays 113. In the present embodiment, the inclined shape increases the axial rigidity of the stays 113, thus achieving improved rigidity of the stays 113 rather than depending solely on the thickening. Consequently, the axial vibration of the stays 113 can be shifted toward higher frequencies while achieving the suppression of the radiated sound from the hub 111 attributable to the diffraction phenomenon.

The inclined shape of the stays 113 becomes particularly important when it is difficult to thicken the stays 113 in the axial direction. As described above, the axial thickness of the stays 113 is limited to the range in which the thickness does not exceed one-half of the wavelength of the axial resonant frequency of the hub 111. However, a situation is assumed in which such a thickness cannot provide sufficient rigidity in the axial direction. The inclined shape of the stays 113 contributes to improving the rigidity of the stays 113 when thickening the stays 113 is limited.

(e) Summarization

Restricting the circumferential width dimension of the stays 113 contributes to decreasing the radiation loss coefficient τ and the area a in the above-described expression (1) defining the equivalent radiated power P. This, on the other hand, lowers the rigidity of the stays 113, possibly leading to a disadvantageous situation for the vibration velocity v in expression (1).

In this respect, according to the present embodiment, the stays 113 are thickened in the axial direction thereby to suppress or reduce an increase in the vibration velocity v. However, if the stays 113 are made excessively thickened in the axial direction, then it will be difficult for the diffraction phenomenon, in which air wraps around behind along the side surfaces of the stays 113, to take place, and the radiation loss coefficient τ will not become sufficiently small.

Therefore, according to the present embodiment, the thickening of the stays 113 in the axial direction is restricted so as to prevent the diffraction phenomenon from slowing down. At this time, the inclined shape of the stays 113 suppresses a decrease in the rigidity in the axial direction, thus contributing to a reduction in the vibration velocity v.

As a result, the values of the three factors of "the radiation loss coefficient τ," "the area a," and "the vibration velocity v" are reduced in a well-balanced manner to reduce the equivalent radiated power P, thus making it possible to reduce the radiated sound emitted from the hub 111.

Figure 5:
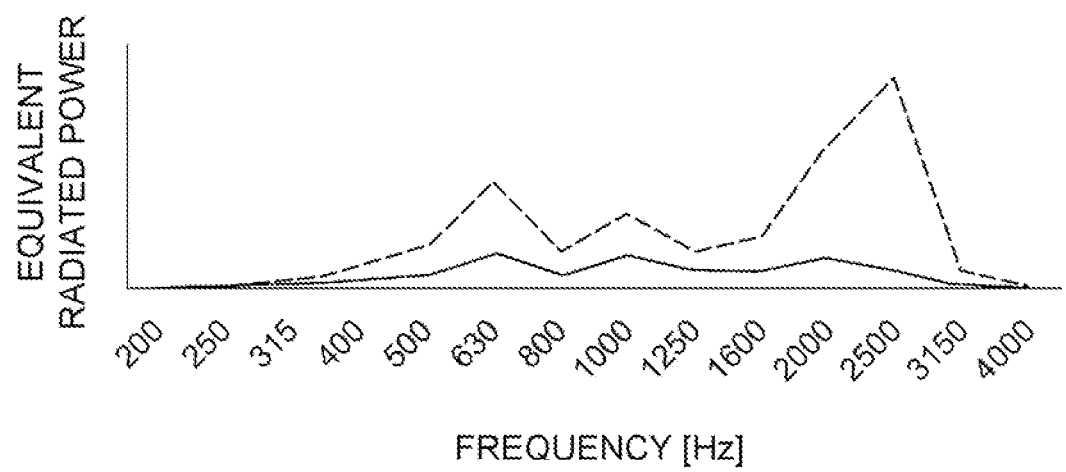
FIG. 5 is a graph illustrating equivalent radiated power for each frequency.
Figure 6:
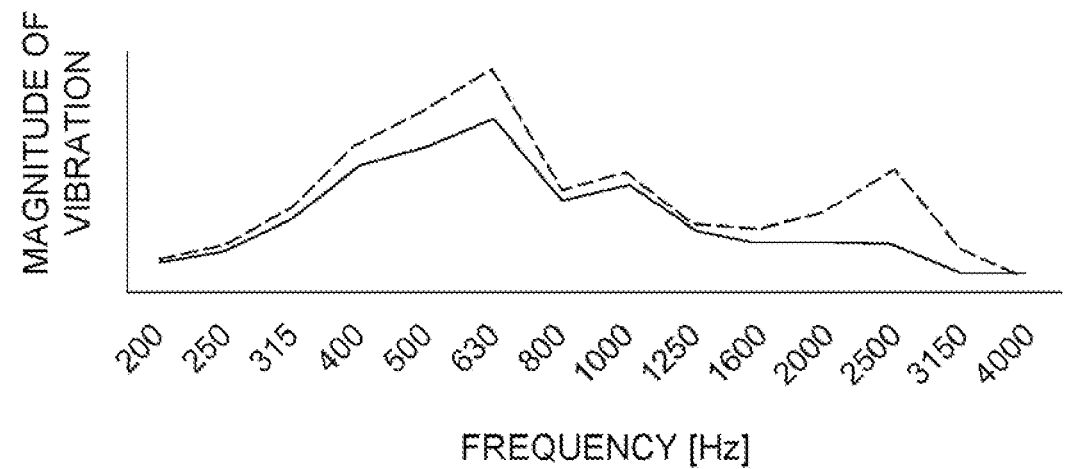
FIG. 6 is a graph illustrating the magnitude of the axial vibration of a vibration ring, which is caused by the axial vibration of the crankshaft, for each frequency.

FIG. 5 and FIG. 6 are graphs illustrating simulation results. In these drawings, the simulation results of the torsional damper 101 of the present embodiment are indicated by the solid lines, while the simulation results of a reference example are indicated by dashed lines. The reference example is a well-known torsional damper having no numeric range like the one for the present embodiment regarding the circumferential width and the axial thickness of the stays 113.

As illustrated in FIG. 5, it can be seen that, compared with the reference example, the equivalent radiated power of the torsional damper 101 of the present embodiment is smaller in a wide frequency band ranging from 400 to 4000 Hz. Especially in the range of 1600 to 3200 Hz, which has a peak frequency slightly over 2500 Hz, the degree of decrease in the equivalent radiated power is markedly noticeable. The fact that there is no significant change in the equivalent radiated power over the entire frequency band can also be said to be an excellent characteristic in comparison with the reference example.

FIG. 6 illustrates the magnitude of the axial vibration of the vibration ring 131 for each frequency.

As described above, when the axial vibration occurs in the crankshaft 12, the vibration ring 131 of the torsional damper 101 resonates in the axial direction at several hundred Hz. Referring to the simulation results of the reference example, it can be seen that the vibration ring resonates with peaks around 630 Hz, 1000 Hz, and 2500 Hz. At this time, in the reference example, the axial rigidity of the hub is low, so that the force due to the axial resonance of the vibration ring is expected to be transmitted to the rim positioned on the outer circumference of the hub through the elastic body, forcibly displacing the rim and thus inconveniently generating radiated sound.

In the present embodiment, the vibration generated in the vibration ring 131 is lower than that in the reference example in every one of the above-mentioned three different frequency ranges. This is considered to be due to the high axial rigidity of the stays 113. Therefore, even when the forcible displacement force caused by the axial resonance of the vibration ring 131 is transmitted to the rim 114, the rim 114 does not easily deform, thus making it possible to reduce the radiated sound in the frequency bands.

3. Modified Examples

In the implementation, various modifications and changes are allowed.

For example, thickening the stays 113 in the axial direction is not necessarily essential if the stays 113 are not required to have more rigidity than necessary.

The inclined shape of the stays 113 is also not essential. If the stays 113 can be given sufficient rigidity without having an inclined shape, or if the stays 113 are not required to have more rigidity than necessary, then the stays 113 may have a straight shape extending from the boss 112 in a direction perpendicular to the axial direction.

Any other changes and modifications are allowed.

The invention claimed is:

1. A torsional damper comprising:
   a hub in which a boss adapted to be fixed to a rotating shaft and an annular rim are integrally provided via a plurality of stays; and
   an annular vibration ring connected to an outer circumferential surface of the rim via an elastic body,
   wherein the stays have a circumferential width dimension that does not exceed one-quarter of a wavelength of an axial resonant frequency of the hub.

2. The torsional damper according to claim 1,
   wherein the stays are thickened within a range in which an axial thickness dimension of the stays does not exceed one-half of the wavelength of the axial resonant frequency of the hub.

3. The torsional damper according to claim 1,
   wherein the stays have an axial thickness dimension that is set to a range from one-quarter to one-half of the wavelength of the axial resonant frequency of the hub.

4. The torsional damper according to claim 1,
   wherein the stays have an axial thickness dimension that is set to a range in which the axial thickness dimension is equal to or more than a circumferential width dimension and equal to or less than one-half of the wavelength of the axial resonant frequency of the hub.

5. The torsional damper according to claim 1,
   wherein the stays are thickened in a range in which the axial thickness dimension of the stays does not exceed one-half of the wavelength of the axial resonant frequency of the hub, and
   the stays have an axial thickness dimension that is set to a range from one-quarter to one-half of the wavelength of the axial resonant frequency of the hub.

6. The torsional damper according to claim 1,
   wherein the stays are thickened in a range in which the axial thickness dimension of the stays does not exceed one-half of the wavelength of the axial resonant frequency of the hub, and the stays have an axial thickness dimension that is set to a range in which the axial thickness dimension is equal to or more than a circumferential width dimension and equal to or less than one-half of the wavelength of the axial resonant frequency of the hub.

7. The torsional damper according to claim 1, wherein the circumferential width dimension of the stays is one-quarter of the wavelength of the axial resonant frequency of the hub.

8. The torsional damper according to claim 1, wherein the stays have an axially inclined shape.

9. The torsional damper according to claim 8, wherein front and back surfaces of the stays, which are shaped to be inclined in the axial direction, have parallel portions.

* * * * *